(12) United States Patent
Schumann et al.

(10) Patent No.: US 11,485,071 B2
(45) Date of Patent: Nov. 1, 2022

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Philipp Schumann, Itzgrund-Schottenstein (DE); Denise Hiemann, Lichtenfels (DE); Marc Bräuer, Ebersdorf bei Coburg (DE); Johanna Windfelder, Breitbrunn (DE); Timo Voigt, Erlangen (DE)

(73) Assignee: CONCEPT LASER GMBH, Lichtenfels (DE)

( * ) Notice: Subject to any disclaimer, the term of this patent is extended or adjusted under 35 U.S.C. 154(b) by 782 days.

(21) Appl. No.: 16/276,613

(22) Filed: Feb. 14, 2019

(65) Prior Publication Data

US 2019/0358897 A1 Nov. 28, 2019

(30) Foreign Application Priority Data

May 23, 2018 (EP) ...................... 18173911

(51) Int. Cl.
| | |
|---|---|
| *B29C 64/129* | (2017.01) |
| *B22F 10/20* | (2021.01) |
| *B29C 64/214* | (2017.01) |
| *B33Y 50/00* | (2015.01) |
| *B33Y 10/00* | (2015.01) |
| *B29C 64/153* | (2017.01) |
| *C04B 35/64* | (2006.01) |

(52) U.S. Cl.
CPC ............ *B29C 64/129* (2017.08); *B22F 10/20* (2021.01); *B29C 64/214* (2017.08); *B22F 2202/11* (2013.01); *B22F 2203/00* (2013.01); *B29C 64/153* (2017.08); *B33Y 10/00* (2014.12); *C04B 35/64* (2013.01); *G06T 2207/10016* (2013.01)

(58) Field of Classification Search
CPC ... B29C 64/129; B29C 64/214; B29C 64/153; B29C 64/393; B29C 64/20; B29C 64/268; B22F 10/20; B22F 2202/11; B22F 2203/00; B33Y 10/00; B33Y 30/00; B33Y 50/00; C04B 35/64; G06T 2207/10016; Y02P 10/25
USPC .......................................................... 700/117
See application file for complete search history.

(56) References Cited

U.S. PATENT DOCUMENTS

| | | | |
|---|---|---|---|
| 2008/0203621 A1 * | 8/2008 | Mattes | B29C 64/153 264/497 |
| 2016/0107233 A1 | 4/2016 | Kobayashi et al. | |
| 2017/0348900 A1 * | 12/2017 | Williams | B33Y 50/02 |
| 2018/0111198 A1 | 4/2018 | Vitanov et al. | |

FOREIGN PATENT DOCUMENTS

| | | |
|---|---|---|
| EP | 3248715 A1 | 11/2017 |
| EP | 3269535 A1 | 1/2018 |
| WO | 2017085468 A1 | 5/2017 |

* cited by examiner

Primary Examiner — Michael J Brown
(74) Attorney, Agent, or Firm — Dority & Manning, P.A.

(57) ABSTRACT

Apparatus (1) for additively manufacturing three-dimensional objects (2) by means of successive layerwise selective irradiation and consolidation of layers (3) of a build material (4) which can be consolidated by means of an energy source.

20 Claims, 2 Drawing Sheets

APPARATUS FOR ADDITIVELY MANUFACTURING THREE-DIMENSIONAL OBJECTS

CROSS-REFERENCE TO RELATED APPLICATIONS

Figure 1:
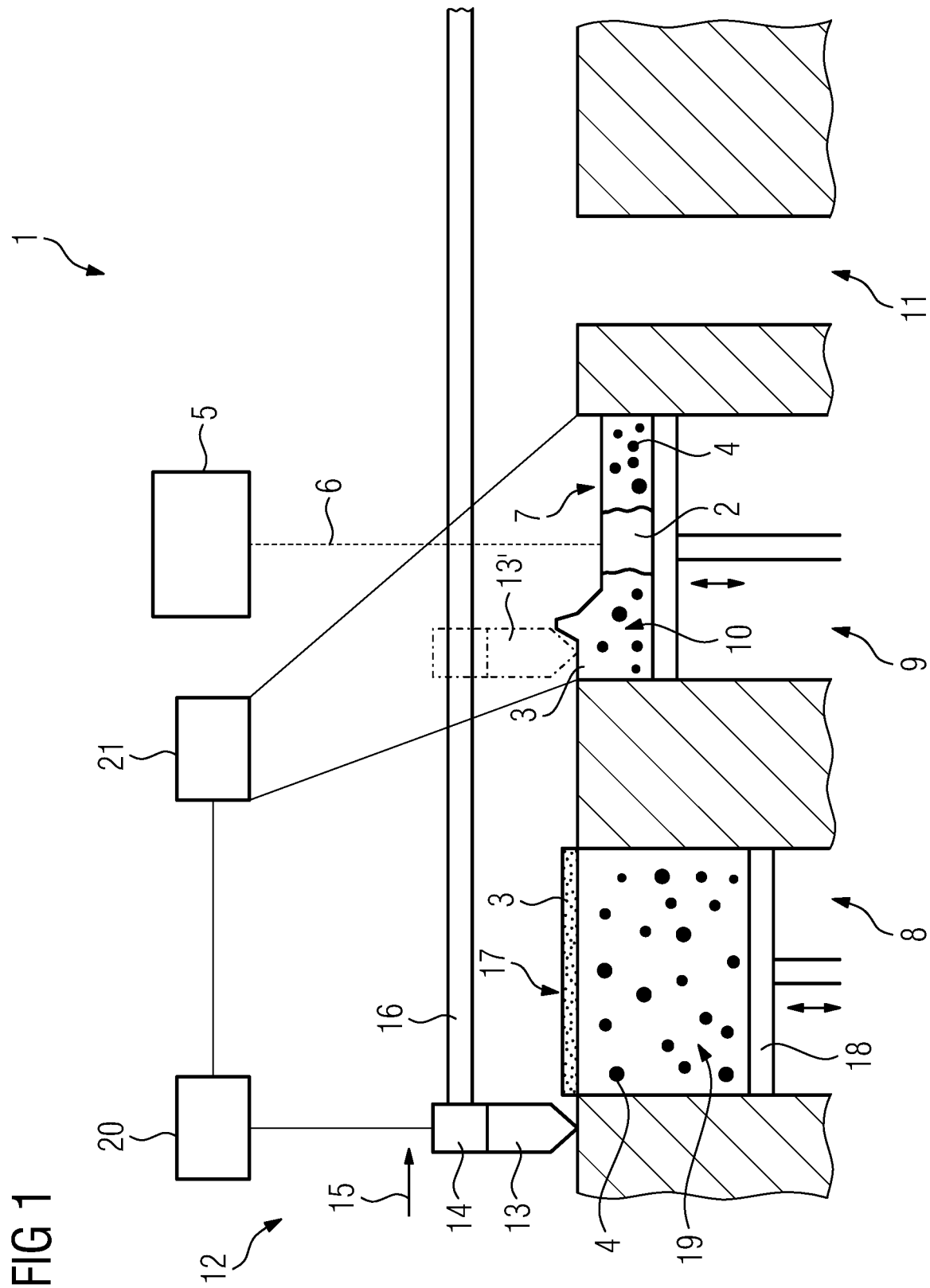

This application claims priority to European Patent Application serial no. 18 173 911.1 filed May 23, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of an energy source, which apparatus comprises an application unit that is adapted to apply build material on a build plane via an application element.

Apparatuses for additively manufacturing three-dimensional objects in which the build material is applied onto/in a build plane to be selectively irradiated and thereby consolidated, are generally known from prior art. Typically, an application unit with at least one application element is provided, wherein the application element can be moved to convey build material to the build plane and distribute the build material evenly in the build plane via a movement of the application element across the build plane. Further, it is known from prior art that the quality of the application of build material in the build plane is crucial for the process quality and/or the object quality of the three-dimensional object that is manufactured in the additive manufacturing process.

For example, the determination device can be provided to monitor the quality of a layer of build material that has been applied on the build plane after an application step and, if too little build material was applied on the build plane, another layer of build material can be applied to ensure that enough build material is applied on the build plane, for instance. However, the options to influence the application quality are limited to the observation of an application quality of a previously applied layer of build material and the application of another layer of build material onto the previously applied layer, if not enough build material is applied in the build plane.

It is an object of the present invention to provide an apparatus for additively manufacturing three-dimensional objects, wherein the application of build material, in particular the distribution of build material, is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to an apparatus for additively manufacturing three-dimensional objects which apparatus comprises an application unit that provides an application element with which build material can be conveyed to the build plane and distributed in the build plane. The invention is based on the idea that the application unit is adapted to control an application velocity with which the application element is moved across the build plane, wherein the application unit is adapted to control the application velocity dependent on at least one application parameter. To convey "fresh" build material, e.g. from a dose module providing fresh build material in the additive manufacturing process, the application unit moves the application element across the build plane. For example, a dose plane of a dose module in which fresh build material can be arranged in advance to the build plane in the application direction along which the application element is moved to pick up fresh build material from the dose plane and convey the build material to the plane in which it is distributed (evenly) via the application element.

The invention therefore, is based on the idea that the application velocity that defines the velocity via which the application element is moved (across the build plane), can be varied to directly influence the application quality of the build material that is applied in the build plane. In particular, the application velocity may be reduced, if the application quality does not meet defined quality requirements, e.g. the build material in the build plane is not properly distributed. Due to the control of the application velocity, in particular a reduction of the application velocity, it is possible to distribute the build material more evenly and therefore, achieve a higher application quality compared with the application of build material with the same application element moving with a comparatively higher application velocity. In other words, it is possible to move the application element with an application velocity that is suitable for properly distributing the build material. On the other hand, the application element may be moved as fast as possible without decreasing the application quality to ensure that the overall process time of the additive manufacturing process can be reduced as far as possible.

Hence, the application element can be moved as slow as necessary and as fast as possible to achieve a defined application quality and finish the additive manufacturing process, in particular each application step, as quickly as possible.

For example, if an application step is performed with a defined dose factor, which defines the amount of build material that is provided to be applied on the build plane, and a defined application quality is not met, the application velocity can be reduced to achieve an application of build material meeting the defined application quality. On the other hand it is possible to increase the application velocity until a decrease in the application quality is detected to ensure that a compromise between a fast application of build material and properly meeting the application quality can be found. Thus, especially in situations in which increasing the dose factor does not increase the application quality, a reduction of the application velocity can contribute to an improvement regarding the application quality. Thus, the waste of non-consolidated build material in the application process can be significantly reduced and the application quality can be enhanced.

According to a first embodiment of the inventive apparatus, the application unit may comprise a control unit or may be connected or connectable with a control unit that is adapted to control the application velocity. The control unit may be built as or understood as internal or external control unit, wherein the control unit may be an internal control unit of the application unit or built as an external control unit external to the application unit and can be connected or connectable with the application unit. The control unit is adapted to generate or send respective (control) signals based on which the application element can be moved.

In particular, the application velocity may be defined via the control unit. It is possible that the application parameter is sent to the control unit or the control unit receives the application parameter, respectively, wherein the control unit is adapted to control the application velocity based on the application parameter. For example, if the application parameter indicates that a decrease in application quality is present or that the application quality of an applied layer of build material does not meet a defined application quality, the control unit may control or adjust the application velocity accordingly to ensure that the application quality of build material that is applied in the build plane meets the defined application quality.

To move the application element across the build plane the application unit preferably comprises a drive unit, in particular a motor, that is adapted to drive the application element with the application velocity across the build plane, preferably dependent on at least one signal received from the control unit. Thus, the application unit may comprise a drive unit that interacts with the application element to move the application element across the build plane to convey and distribute the build material in the build plane. The application element may, for example, be built as rake or rake-like coater element, in particular a re-coater blade, that is moved over a dose plane to pick up fresh build material and move (push/pull) the build material from the dose plane to the build plane, in which the build material is (evenly) distributed to form a fresh layer of build material on a build plate or a previously applied (and partially consolidated) layer of build material. Dependent on the control signal the control unit sends to the drive unit, it is possible to adjust or control the application velocity with which the application element is moved across the build plane.

As described before, the application velocity has direct impact on the application quality, as the distribution of build material in the build plane, in particular the application of an even layer of build material in the build plane, strongly depends on the velocity via which the application element is moved over the build plane. Thus, it is possible to reduce the application velocity to a defined application velocity via which an application of build material meeting a defined application quality under the circumstances and conditions currently present in the additive manufacturing process can be achieved.

Preferably, the application unit may be adapted to automatically control the application velocity. For example, it is possible that the application unit receives corresponding signals, i.e. sent via the control unit based on the application parameter that may be determined, as will be described below, wherein an automated control of the application velocity can be performed based on the application parameter. If a decrease in the application quality is received, a corresponding application parameter may be determined by the control unit, wherein the drive unit may be controlled in that the application velocity of the application element is reduced accordingly to ensure that the build material applied on the build plane is distributed properly. It is also possible to increase the application velocity until a decrease in the application quality is determined, wherein a compromise between high application velocity and a proper application quality can be found automatically, as well.

For example, the application unit may be adapted to automatically perform a calibration procedure (test application) in which an optimal application velocity for the conditions that are present in the additive manufacturing process can be found, wherein build material may be applied to the build plane with the defined application velocity. The application velocity may be decreased until a defined application quality is reached or the application unit may be adapted to increase the application velocity until a decrease in application quality is detected. In both ways it is therefore, possible to detect a maximum application velocity with which the application element can be moved across the build plane and wherein the defined application quality is still met. Thus, a compromise between a reduction of process time and the achievement of defined process quality can be found automatically. Hence, it is possible to perform a test application based on which the application velocity can be determined and controlled. Of course, it is possible to verify the determined application velocity throughout the additive manufacturing process, for example in defined intervals or randomly.

As described before, the application velocity with which the application element is moved across the build plane can be controlled dependent on the application parameter. The application parameter may define the conditions under which the application process is performed, which application parameter directly influences or describes the conditions influencing the application quality and therefore, whether the application velocity is suitable for applying build material under those defined conditions. Generally, any parameter that contributes to or describes or influences the application quality with which build material is applied on the build plane can be used as application parameter or can be comprised in the application parameter.

The application parameter may in particular be or may in particular comprise an application quality and/or a particle size of the build material and/or a particle size distribution of the build material and/or a type of build material and/or a physical or chemical parameter of the build material, in particular the humidity. Therefore, the application parameter may be or may relate to an application quality that can, for example, be detected or determined via a corresponding sensor, as will be described below. Thus, the control of the application velocity can be performed directly dependent on the application quality, wherein it is possible to detect the application quality and therefore, reduce the application velocity, if a decrease in the application quality is determined, for instance. It is also possible to control the application velocity of the application element dependent on the type of build material that is used in the additive manufacturing process, for example whether a metal or a ceramic or a synthetic material is used as build material. It is also possible to differ between different types of materials, such as aluminum and/or steel and/or titanium and the specific distribution behavior of such materials becoming applied in the build plane.

Additionally or alternatively, it is possible to have the application parameter comprising a particle size of the build material and/or a particle size distribution of the build material. The particle size of the build material used in the additive manufacturing processes strongly influences the behavior of the build material when it is applied in the build plane. Also, the particle size distribution of the build material, i.e. the presence of different particles with different sizes, e.g. particle diameters, influences the distribution behavior of the build material as well. For example, smaller build material particles or build material comprising a particle size distribution with a high a ratio of small particles can be distributed in the build plane more evenly and/or more easily compared with larger build material particles or build material comprising a particle size distribution with a high ratio of large particles.

In other words, it is possible to increase the application velocity, if the build material comprises (comparatively) small build material particles or a particle size distribution comprising a high ratio of small particles compared with an application step in which build material is used that comprises large build material particles or a particle size distribution comprising high ratio of large particles. Vice versa, if the build material that is used comprises large build material particles or a particle size distribution comprising a high ratio of large particles, the application velocity can be reduced to ensure that the defined application quality is still met.

The inventive apparatus can advantageously be improved in that a determination unit may be provided that is adapted to determine the at least one application parameter. As described before, the application parameter may be or may comprise an application quality and/or a particle size of the build material and/or a particle size distribution of the build material and/or a type of build material. The determination unit according to this embodiment of the inventive apparatus may be provided for determining the application parameter. The determination unit may therefore, determine the application parameter, wherein the determined application parameter may be provided to the application unit, in particular to the control unit, wherein an automated control of the application velocity can be performed based on the determined application parameter.

The determination unit may preferably be or may preferably comprise at least one optical sensor, in particular a CCD or CMOS sensor, preferably a camera. The optical sensor of the determination unit may therefore, be used to determine the application parameter, as described before. For example, the application unit may capture an image of the build material to derive the particle size and/or the particle size distribution of the build material. It is also possible to derive the type of build material via a determination unit, as described before. It is also possible to capture an image of the build plane, in particular of the previously applied layer of build material, and to derive whether the application of build material meets a defined application quality.

For example, a determination can be performed whether the last applied layer of build material covers the build plane properly achieving a defined layer thickness or whether parts of the object to be manufactured are visible through the last applied layer. It is also possible to derive whether the previously applied layer of build material is distributed evenly or whether regions of the build plane are present in which the build material is not properly applied. Dependent on the application parameter that is derived or determined via the determination unit it is possible to perform the control of the application velocity, as described before.

The application unit may preferably be adapted to reapply build material dependent on the at least one application parameter, in particular with the same or a different application velocity. For example, a previously applied layer of build material can be captured via the determination unit, wherein if the determination unit determines that the previously applied layer of build material is not applied meeting defined application quality, i.e. build material is not evenly distributed in the build plane, the application unit may reapply a layer of build material, e.g. to fill the gaps in the build plane. The reapplication of the layer of build material may be performed with the same or a different application velocity, wherein the application unit, in particular the control unit, may choose to adjust or control the application velocity dependent on the application parameter.

According to another preferred embodiment of the inventive apparatus, the application unit may be adapted to control the application velocity differently for at least two regions of the object and/or the build plane, in particular at least two regions in the same layer of build material that is to be applied. Thus, it is possible that the application unit varies the application velocity of the build material during an application step, wherein build material is applied with a different application velocity in at least two regions of the build plane. It is also possible to vary the application velocity between the dose plane and the build plane, for instance. Thus, the application element may be moved faster over the dose plane than over the build plane. Of course, multiple regions may be defined, wherein the application element may be moved with an individual application velocity over each of the regions.

The at least two regions may particularly lie in the same layer of build material that is to be applied, wherein it is also possible to have the application unit vary the application velocity differently for two different layers of build material, wherein the application velocity in each of the two layers can be chosen uniformity or differently for at least two regions of layer, for instance. For example, it is possible to differentiate between at least two regions of the build plane, e.g. regarding the defined application quality for those regions. Thus, it is possible to have at least one region with a comparatively higher quality requirement and therefore, it is necessary to control the application velocity in this region correspondingly, whereas in another region that does not comprise a high quality requirement, it is possible to increase the application velocity to save time required for the application of build material to reduce the overall process time as far as possible.

Regarding the embodiment described before, at least one region may be a region of the build plane that is to be irradiated in the additive manufacturing process and at least one other region may be a region of the build plane that is not to be irradiated in the additive manufacturing process. Thus, it is possible to control the application velocity differently for the at least two regions, wherein one region is to be irradiated in the additive manufacturing process and the other region is not to be irradiated in the additive manufacturing process. Hence, the quality requirement for the region of the build plane that is to be irradiated is comparatively higher, as build material will be irradiated and thereby consolidated during the additive manufacturing process in this region, whereas the other region that is not irradiated in the additive manufacturing process does not pose such quality requirements, as no build material is to be irradiated in such a region. Therefore, it is possible to adjust the application velocity differently for the at least two regions to ensure that the application quality is properly met in the region that is to be irradiated in the additive manufacturing process, whereas the application velocity can be increased in the region that is not to be irradiated in the additive manufacturing process to save time in the application step.

The application unit may further be adapted to control the dose factor defining the amount of build material that is provided for an application step. As described before, the dose factor defines the amount of build material that is provided to be applied in the build plane. For example, a dose module, a build module and an overflow module may be provided in the additive manufacturing apparatus, wherein the dose module comprises a dose chamber in which fresh build material is received to be applied in the additive manufacturing process. The build module is used to receive the build material that is provided via the dose module and to carry the object in the additive manufacturing process, which is layerwise and successively built from the build material that is provided via the dose module. The overflow module is adapted to receive surplus build material from the build plane, wherein the application element is moved from the dose plane over the build plane and surplus build material is conveyed to the overflow module in which it can be received.

By controlling the dose factor it is possible to control the amount of build material that is provided to be conveyed via the application element and distributed in the build plane via the application element. By varying the dose factor the amount of build material that is necessary to apply a proper layer of build material in the build plane can be adjusted, wherein also the amount of surplus build material can be reduced. Thus, the dose factor can be controlled to achieve a compromise between the amount of surplus build material that is wasted in the additive manufacturing process and a dose factor high enough to ensure that a proper layer of build material can be applied in the application step. Besides, it is also possible to control the dose factor dependent on the application parameter, e.g. determined via the determination unit, as described before.

According to another embodiment of the inventive apparatus, the application unit may be adapted to control the application velocity based on at least one user input. Thus, it is possible that the user may choose or may adjust the application velocity, e.g. via a user interface. The user may for example perform a visual inspection of an applied layer of build material and adjust the application velocity dependent on the result of the visual inspection. Hence, it is possible that the user may directly influence the additive manufacturing process, e.g. control the application velocity of the application element directly, for example to reduce the overall process time or to enhance the application quality with which build material is applied in the build plane.

Besides, the invention relates to an application unit for an apparatus for additively manufacturing three-dimensional objects by means of successive layerwise selective irradiation and consolidation of layers of a build material which can be consolidated by means of an energy source, in particular an inventive apparatus, as described before, which apparatus comprises an application unit that is adapted to apply build material on a build plane via an application element, wherein the application unit is adapted to control an application velocity with which the application element is moved across the build plane, wherein the application unit is adapted to control the application velocity dependent on at least one application parameter.

Further, the invention relates to a method for operating at least one apparatus for additively manufacturing three-dimensional objects by means of successive layerwise selective irradiation and consolidation of layers of a build material which can be consolidated by means of an energy source, in particular an inventive apparatus, as described before, which apparatus comprises an application unit that is adapted to apply build material on a build plane via an application element, wherein the application velocity with which the application element is moved across the build plane is controlled dependent on at least one application parameter.

Of course, all features, details and advantages described with respect to the inventive apparatus are fully transferable to the inventive application unit and the inventive method.

Figure 2:
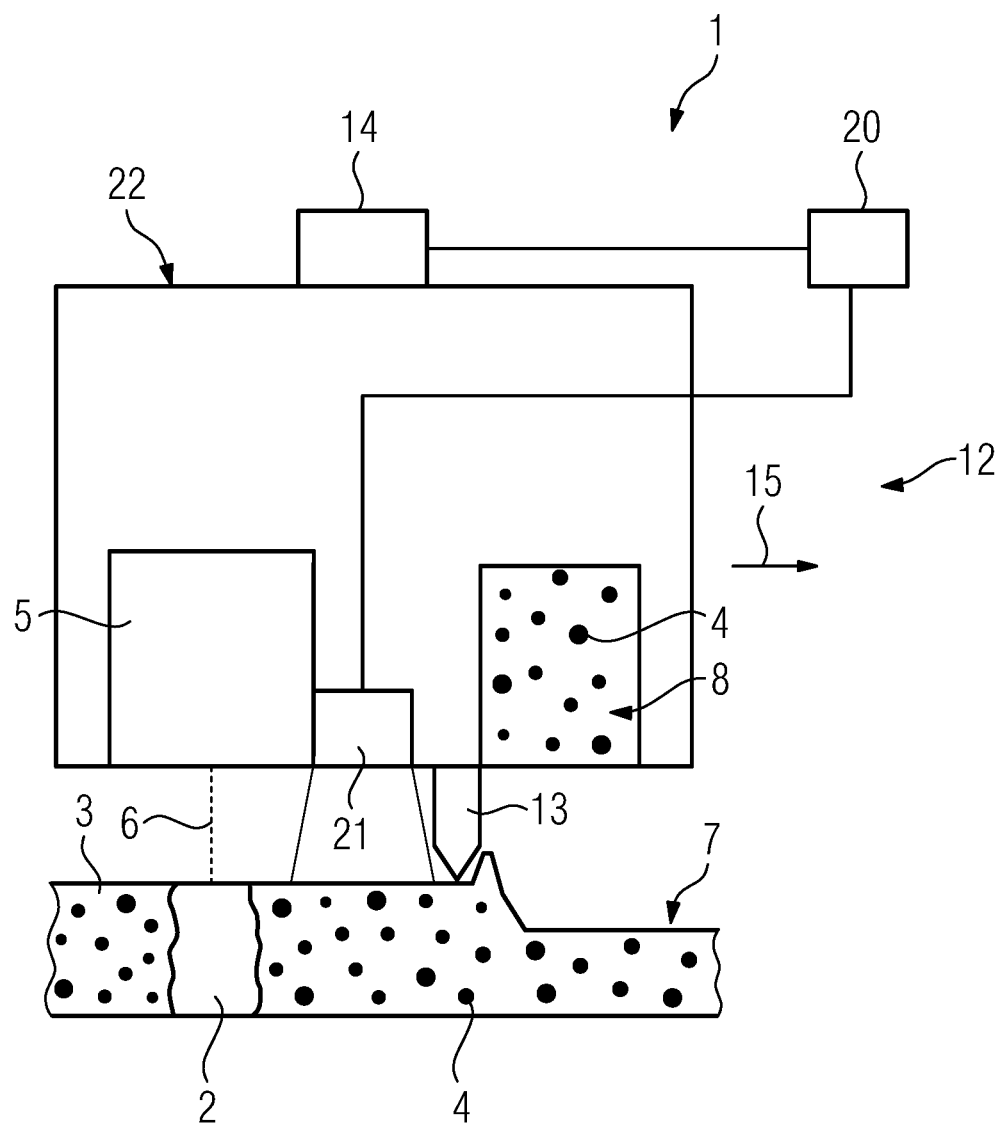

Exemplary embodiments of the invention are described with reference to the Fig. The Fig. are schematic diagrams, wherein FIG. 1 shows an inventive apparatus according to a first embodiment; and FIG. 2 shows an inventive apparatus according to a second embodiment.

FIG. 1 shows an apparatus 1 for additively manufacturing three-dimensional objects 2 by means of successive layerwise selective irradiation and consolidation of layers 3 of the build material 4 which can be consolidated by means of an energy source. For example, an irradiation device 5 is provided which is adapted to generate an energy beam 6, such as a laser beam, that can selectively be guided over a build plane 7 in which the additive manufacturing process is performed, i.e. in which build material 4, in particular a previously applied layer 3 of build material 4, can selectively be consolidated due to the irradiation with the energy beam 6.

In this exemplary embodiment three modules are provided (optional), wherein a dose module 8 is used for providing fresh build material 4 to the additive manufacturing process and a build module 9 is provided for receiving the build material 4 from the dose module 8, wherein in a build chamber 10 of the build module 9 which is delimited by the build plane 7 and respective walls and a build plate of the build module 9, the non-consolidated build material 4 and the object 2 are received. In other words, the build module 9 carries the powder bed of build material 4 in which the object 2 is additively manufactured. Further, an overflow module 11 is provided for receiving surplus build material 4 that is conveyed from the dose module 8 over the build module 9 and cannot be received within the build chamber 10.

Regarding the application process of build material 4, the inventive apparatus 1 comprises an application unit 12 with an application element 13 that is coupled with a drive unit 14, for example a motor. The drive unit 14 is adapted to move the application element 13 along the application direction 15, for example along a pair of rails 16 over the dose module 8, the build module 9 and the overflow module 11. In particular, the application element 13 may be built as rake or as coater blade, wherein the application element 13 make pick up a layer 3 of fresh build material 4 from a dose plane 17 provided via the dose module 8. Particularly, the dose module 8 comprises a dose plate 18 carrying the build material 4 received in a dose chamber 19. By varying the position of the dose plate 18, in particular by moving the dose plate 18 upwards, build material 4, in particular a layer 3 of build material 4, can be provided to the additive manufacturing process. Further, a dose factor defining the amount of build material 4 that is provided for each application step, can be adjusted via the movement of the dose plate 18.

The application process is performed by moving the application element 13 in application direction 15, wherein build material 4 is picked up from the dose plane 17 and moved in application direction 15 to the build plane 7, wherein the build material 4 is applied as fresh layer 3 of build material 4 in the build plane 7 covering the previously applied layer and the already built part of the object 2. The position of the application element 13 is depicted as silhouette 13' moving (pushing/pulling) build material 4 that has been picked up from the dose plane 17 and distributing the build material 4 in the build plane 7. Build material 4 that is not received within the build chamber 10, is depleted in the overflow module 11 and can be removed from the additive manufacturing process.

The application unit 12 is adapted to control an application velocity of the application element 13 with which the application element 13 is moved in application direction 15 over the build plane 7. Of course, it is also possible to control the application velocity of the application element 13 moving over the dose plane 17 and the overflow module 11.

The application unit 12 comprises a control unit 20 via which the drive unit 14 of the application unit 12 is connected, wherein the control unit 20 can also be understood as or deemed as internal control unit of the application unit 12. Dependent on control signals the control unit 20 sends to the drive unit 14, the application element 13 is moved across the build plane 7, wherein in particular the application velocity can be controlled via the control unit 20 dependent on an application parameter.

According to this exemplary embodiment, the application parameter describes the type of build material that is used in the additive manufacturing process, the particle size of the build material 4 and the particle size distribution of the build material 4 and/or a physical or chemical parameter of the build material 4, in particular the humidity of the build material 4. The type of build material can, for example, as well as the other parameters, be input via a user interface (not shown). Of course, it is also possible to determine the type of build material, the particle size of the build material 4 and the particle size distribution of the build material 4 that is used in the additive manufacturing process.

To perform the determination of the application parameter, the application unit 12 comprises a determination unit 21 that is adapted to determine the application parameter. In this exemplary embodiment, the determination unit 21 is built as optical determination unit comprising an optical sensor, for example a CCD or a CMOS camera. The determination unit 21 is further adapted to image the build plane 7 onto the optical sensor to derive whether the previously applied layer 3 of build material 4 meets defined application quality requirements, in particular whether an evenly distributed layer 3 of build material 4 has been applied in the build plane 7. Dependent on the application parameter, in particular dependent on the application quality which the application parameter indicates, the control unit 20 that receives the application parameter is adapted to control the application velocity of the application element 13.

For example, it is possible that the determination unit 21 determines a decrease in application quality or determines that the application quality does not meet defined application quality requirements. For example, an uneven distribution of build material 4, such as an identified gap in the build plane 7, can be determined and the control unit 20 may decrease the application velocity to enhance the application quality. It is also possible to increase the application velocity as long as no impact on the application quality is detected to reduce the overall process time, as far as possible.

It is also possible to define different regions of the build plane 7 and controlling the application velocity differently for the different regions. For example, it is possible to move the application element 13 with a higher application velocity in regions of the build plane 7 that are not to be irradiated during the additive manufacturing process, i.e. regions left and right from the object 2 in this exemplary embodiment. In regions of the build plane 7 that are to be irradiated in the additive manufacturing process, such as a region of the layer 3 of build material 4 above the object 2 that is to be irradiated and thereby consolidated via the energy beam 6, a comparatively lower application velocity can be chosen to ensure that the build material 4 is properly applied and distributed in the corresponding region of the build plane 7.

Further, a dose factor, as described before, can also be adjusted via the control unit 20 to ensure that enough build material 4 is provided in the dose plane 7 to be conveyed and distributed via the application element 13 in the build plane 7. Of course, the amount of build material 4 that is provided via the dose module 8 may also be controlled dependent on the application parameter, as described before.

FIG. 2 shows an apparatus 1 according to a second embodiment. As the apparatus 1 that is depicted in FIG. 2 generally follows the same set-up as the apparatus 1 that is depicted in FIG. 1, the same numerals are used for same parts.

The apparatus 1 that is depicted in FIG. 2 comprises an application unit 12, which is integrated into a combined module 22, which combined module 22 can be moved in application direction 15 via the drive unit 14 dependent on control signals from the control unit 20, as described before. The combined module 22 comprises a dose module 8 that is adapted to provide build material 4 onto the build plane 7, wherein an application element 13, as described with respect to the embodiment depicted in FIG. 1, is adapted to convey the build material 4 and to distribute the build material 4 in the build plane 7 in that a uniform even layer 3 of build material 4 is achieved.

The control unit 20 is also connected to a determination unit 21, as described before, with respect to the embodiment depicted in FIG. 1, wherein the layer 3 of build material 4 arranged in the build plane 7 can be analyzed and the application parameter can be determined. The irradiation device 5 is also integrated in the combined module 22, wherein the irradiation device 5 is adapted to generate the energy beam 6 to selectively irradiate the layer 3 of build material 4 arranged in the build plane 7 to form the object 2. The determination unit 21 may comprise at least one, e.g. two light sources that are adapted to illuminate at least one area of build material 4 applied in the build plane 7.

Of course, the application unit 12, in particular the control unit 20, is adapted to control the application velocity via which the combined module 22 is moved over the build plane 7 in application direction 15. Of course, the application element 13 that is connected or coupled with the combined module 22 is also moved in application direction 15 with the same application velocity as the combined module 22. Dependent on the application parameter that is, for example, determined via the determination unit 21, the control unit 20 may control the application velocity to ensure that quality requirements regarding the application quality of the layer 3 of build material 4 are met.

Of course, all details, features and advantages described with respect to the individual embodiments are fully transferable and can be arbitrarily combined. Further, the inventive method may be performed on the inventive apparatus 1.

The invention claimed is:

1. An apparatus for additively manufacturing three-dimensional objects by successive layerwise selective irradiation and consolidation of layers of a build material by an energy source, the apparatus comprising:
an application unit configured to apply the build material on a build plane via an application element, wherein the application unit is further configured to control an application velocity at which the application element is moved across the build plane based on at least one application parameter.

2. The apparatus according to claim 1, wherein the application unit comprises a control unit or is connected or connectable with a control unit configured to control the application velocity.

3. The apparatus according to claim 2, wherein the application unit comprises a drive unit configured to drive the application element at the application velocity across the build plane, the drive unit being dependent on at least one signal received from the control unit.

4. The apparatus according to claim 1, wherein the application unit is adapted to automatically control the application velocity.

5. The apparatus according to claim 1, wherein the at least one application parameter comprises:
an application quality;
a particle size of the build material;
a particle size distribution of the build material; and/or
a type of build material.

6. The apparatus according to claim 1, further comprising:
a determination unit configured to determine the at least one application parameter.

7. The apparatus according to claim 6, wherein the determination unit is or comprises an optical sensor.

8. The apparatus according to claim 1, wherein the application element is configured to reapply the build material based on the at least one parameter.

9. The apparatus according to claim 1, wherein the application unit is configured to determine a defined application velocity via at least one test application of the build material.

10. The apparatus according to claim 1, wherein the application unit is configured to control the application velocity differently for at least two regions of the build plane.

11. The apparatus according to claim 10, wherein at least one region of the at least two regions of the build plane is a region of the build plane to be irradiated in the additive manufacturing process, and an at least one other region of the at least two regions of the build plane is a region of the build plane not to be irradiated in the additive manufacturing process.

12. The apparatus according to claim 1, wherein the application unit is configured to control a dose factor defining an amount of the build material provided in an application step.

13. The apparatus according to claim 1, wherein the application unit is configured to control the application velocity based on at least one user input.

14. An application unit for an apparatus for additively manufacturing three-dimensional objects by successive layerwise selective irradiation and consolidation of layers of a build material by an energy source, the application unit comprising:
an application element configured to apply the build material on a build plane, wherein an application velocity at which the application element is moved across the build plane, is dependent on at least one application parameter.

15. The application unit according to claim 14, wherein the at least one application parameter comprises:
an application quality;
a particle size of the build material;
a particle size distribution of the build material; and/or
a type of build material.

16. A method for operating at least one apparatus for additively manufacturing three-dimensional objects by successive layerwise selective irradiation and consolidation of layers of a build material by an energy source, the method comprising:
applying the build material on a build plane via an application element of an application unit; and
controlling an application velocity at which the application element is moved across the build plane, based on at least one application parameter.

17. The method according to claim 16, wherein controlling the application velocity is controlled via a control unit of the application unit.

18. The method according to claim 17, further comprising:
driving the application element at the application velocity across the build plane via a drive unit of the application unit, wherein the driving of the application element by the drive unit is dependent on the drive unit receiving at least one signal from the control unit.

19. The apparatus according to claim 16, wherein the at least one application parameter comprises:
an application quality;
a particle size of the build material;
a particle size distribution of the build material; and/or
a type of build material.

20. The method according to claim 16, further comprising:
determining the at least one application parameter via a determination unit of the application unit, wherein the determination unit comprises an optical sensor.

* * * * *